(12) United States Patent
Braedt

(10) Patent No.: US 10,189,304 B2
(45) Date of Patent: Jan. 29, 2019

(54) HUB FOR A BICYCLE

(71) Applicant: SRAM Deutschland GmbH, Schweinfurt (DE)

(72) Inventor: Henrik Braedt, Hambach (DE)

(73) Assignee: SRAM Deutschland GMBH, Schweinfurt (DE)

( * ) Notice: Subject to any disclaimer, the term of this patent is extended or adjusted under 35 U.S.C. 154(b) by 96 days.

(21) Appl. No.: 15/209,322

(22) Filed: Jul. 13, 2016

(65) Prior Publication Data
US 2017/0015136 A1    Jan. 19, 2017

(30) Foreign Application Priority Data
Jul. 13, 2015 (DE) .................. 10 2015 009 041

(51) Int. Cl.
*B60B 27/00* (2006.01)
*B60B 27/02* (2006.01)
*B60B 27/04* (2006.01)

(52) U.S. Cl.
CPC ...... *B60B 27/0078* (2013.01); *B60B 27/0015* (2013.01); *B60B 27/023* (2013.01); *B60B 27/047* (2013.01); *B60B 27/0005* (2013.01); *B60B 27/0031* (2013.01); *B60B 2310/316* (2013.01); *B60B 2380/70* (2013.01); *B60B 2380/90* (2013.01); *B60B 2900/212* (2013.01); *B60B 2900/321* (2013.01); *B60Y 2200/13* (2013.01)

(58) Field of Classification Search
CPC . B60B 27/0078; B60B 27/023; B60B 27/047; B60B 2310/316; B60B 27/005
See application file for complete search history.

(56) References Cited

U.S. PATENT DOCUMENTS

| 728,376 A | 5/1903 | Davis | |
|---|---|---|---|
| 2,279,593 A * | 4/1942 | Myers | F16C 35/063 29/283 |
| 2,462,155 A * | 2/1949 | Benjamin | B23B 31/204 279/4.09 |
| 2,800,986 A | 7/1957 | Der et al. | |
| 4,531,847 A * | 7/1985 | F'Geppert | B23P 11/005 384/519 |
| 4,593,799 A | 6/1986 | Ozaki | |

(Continued)

FOREIGN PATENT DOCUMENTS

| DE | 19847673 A1 | 4/2000 |
|---|---|---|
| DE | 102012016945 A1 | 3/2014 |

(Continued)

*Primary Examiner* — Stacey A Fluhart

(57) ABSTRACT

The present invention relates to a hub for a bicycle, having a hub axle, a hub sleeve which is mounted rotatably on the hub axle via a bearing arrangement, a driver which is mounted rotatably on the hub axle via a bearing arrangement and is coupleable to the at least one hub sleeve in a torque-transmitting manner, wherein the bearing arrangement has at least one axially inner bearing and at least one axially outer bearing. At least one fastening element is provided, which fixes at least the inner bearing of the bearing arrangement in its predetermined position on the hub axle by a local or sectional enlargement of the cross section of the hub axle.

9 Claims, 11 Drawing Sheets

(56) References Cited

U.S. PATENT DOCUMENTS

| | | | |
|---|---|---|---|
| 4,676,672 A * | 6/1987 | Tufty | F16C 35/063 384/537 |
| 4,973,173 A * | 11/1990 | Bergling | F16C 19/30 384/538 |
| 5,222,817 A * | 6/1993 | Glazier | F16C 25/06 384/538 |
| 5,324,100 A | 6/1994 | James | |
| 5,676,227 A | 10/1997 | Hugi | |
| 5,964,332 A | 10/1999 | King | |
| 6,588,564 B1 | 7/2003 | Jager et al. | |
| 7,059,686 B2 | 6/2006 | Kanehisa | |
| 7,562,755 B2 | 7/2009 | Spahr | |
| 7,766,143 B1 | 8/2010 | Chen | |
| 2005/0052072 A1 * | 3/2005 | Schlanger | B60B 27/023 301/110.5 |
| 2005/0139444 A1 * | 6/2005 | Kanehisa | B60B 27/0005 192/64 |
| 2014/0060992 A1 | 3/2014 | Spahr et al. | |
| 2014/0110208 A1 | 4/2014 | Braedt | |
| 2014/0238808 A1 | 8/2014 | Lai | |

FOREIGN PATENT DOCUMENTS

| | | |
|---|---|---|
| DE | 102012020472 A1 | 4/2014 |
| DE | 102012016949 A1 | 5/2014 |
| EP | 0557011 A2 | 8/1993 |
| EP | 1547815 A2 | 6/2005 |
| EP | 1798058 A2 | 6/2007 |
| GB | 191227136 A | 11/1913 |

* cited by examiner

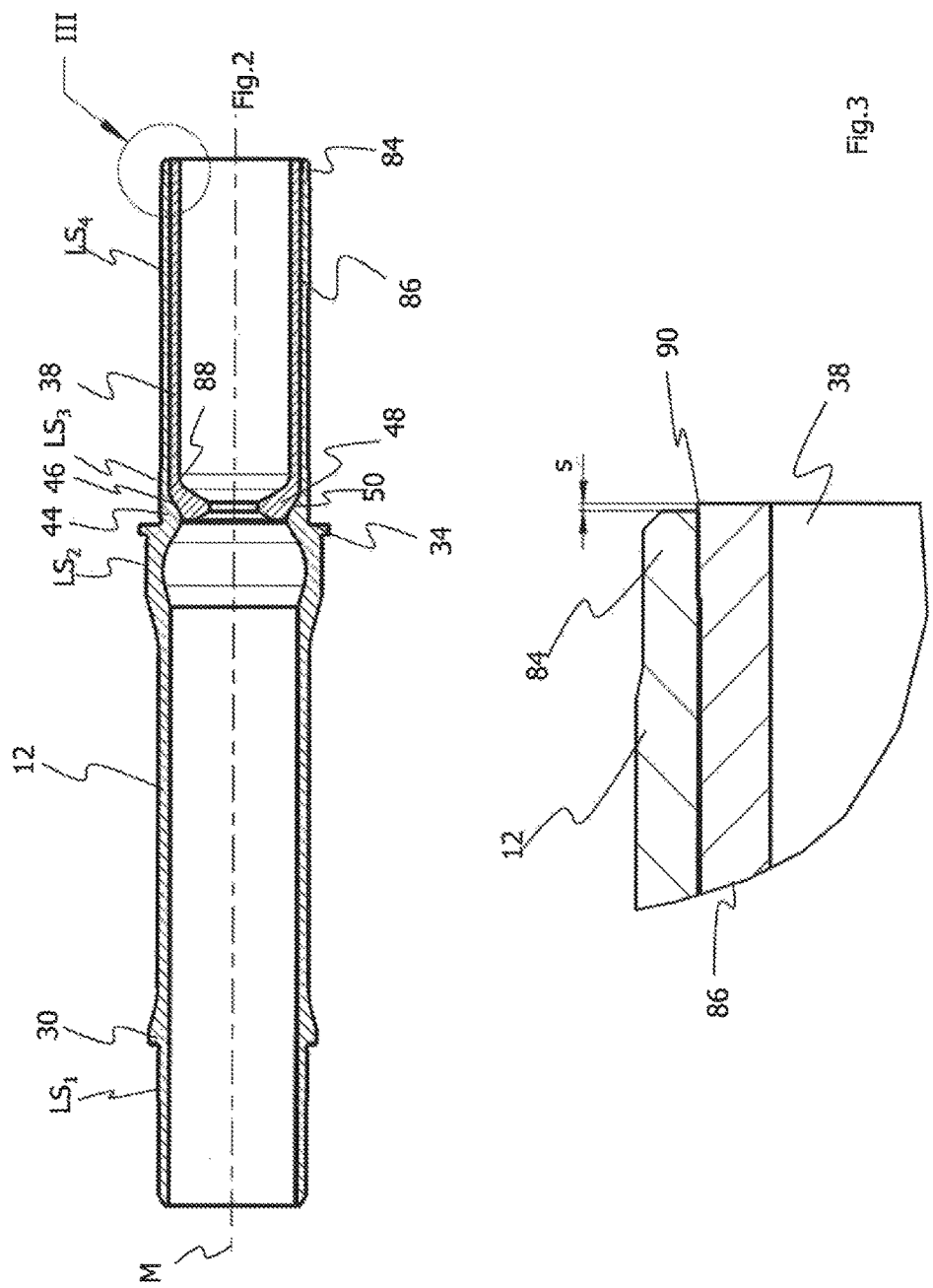

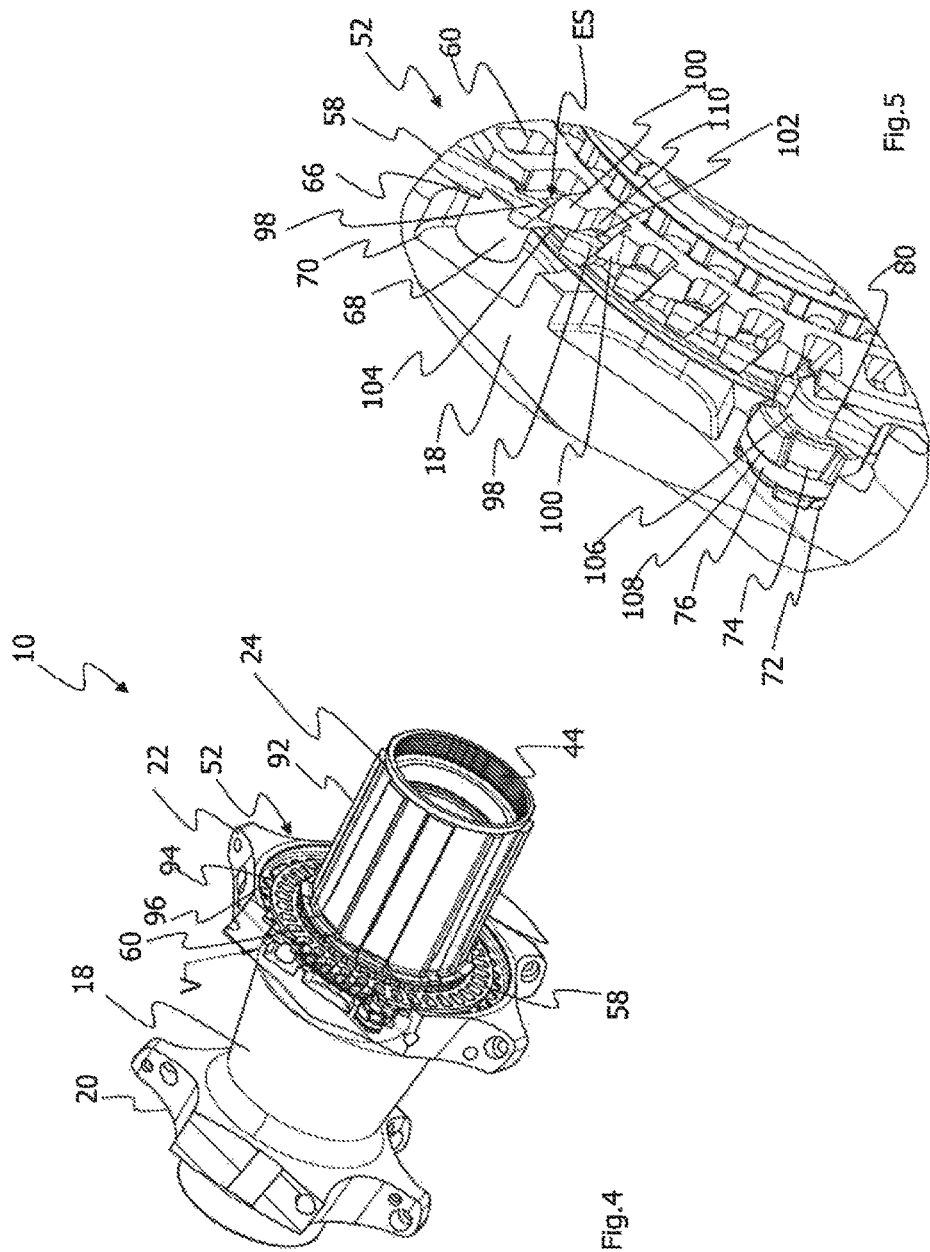

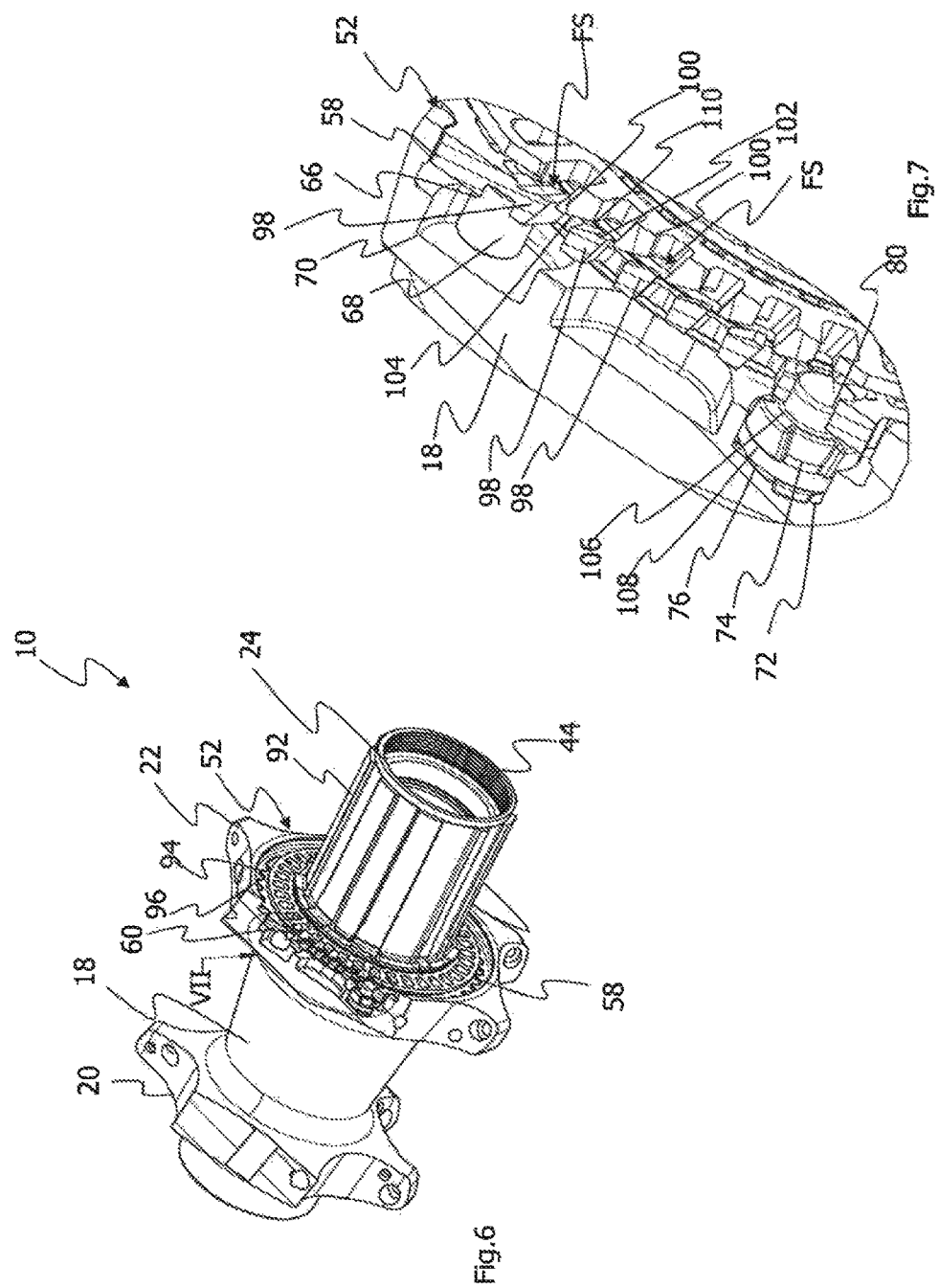

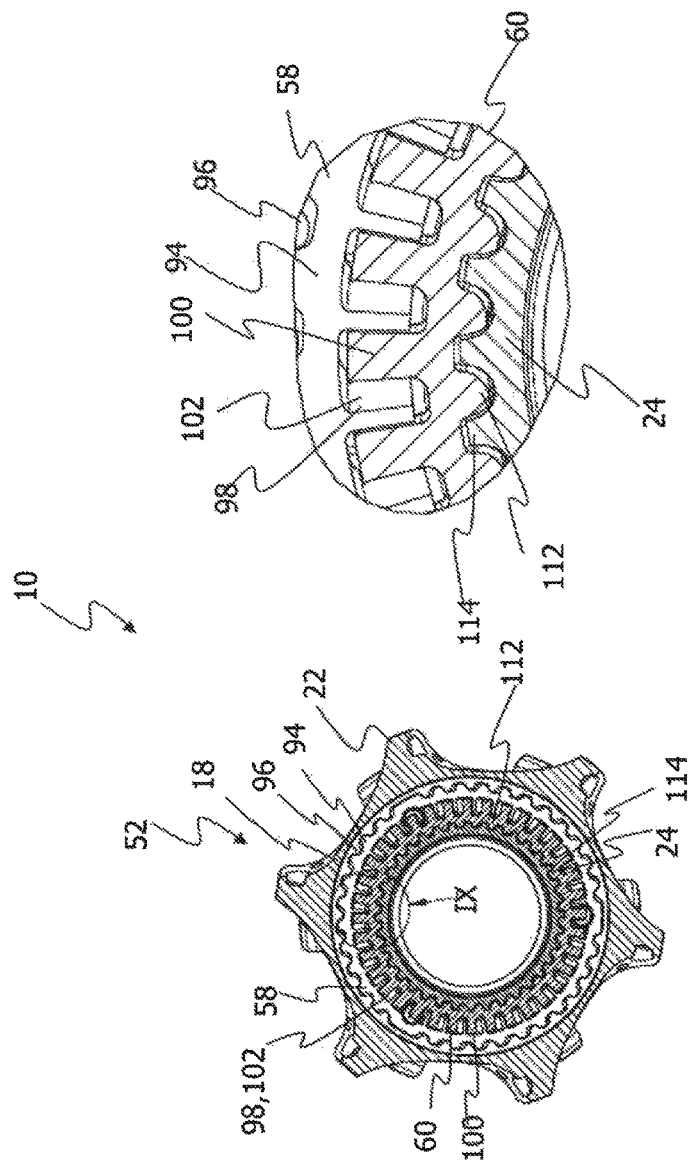

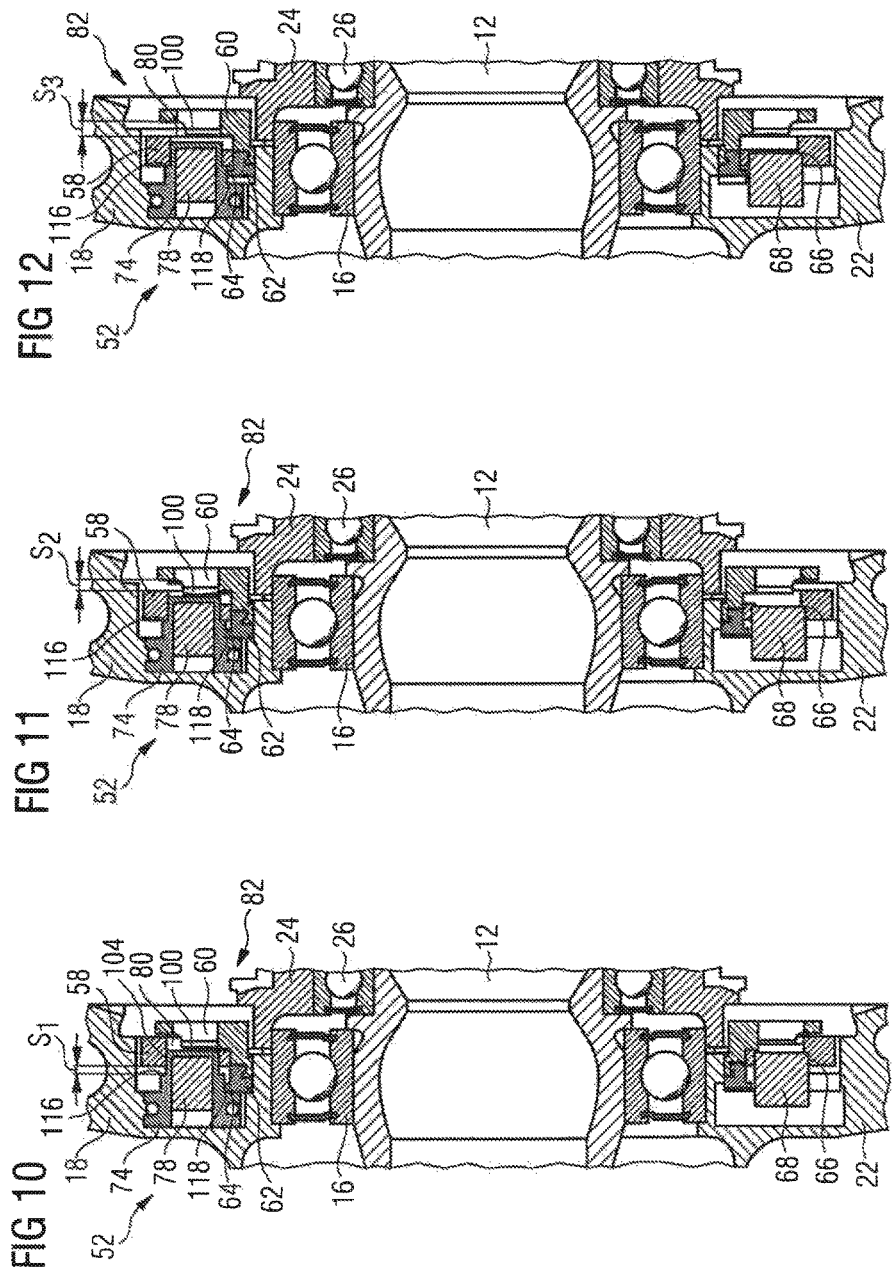

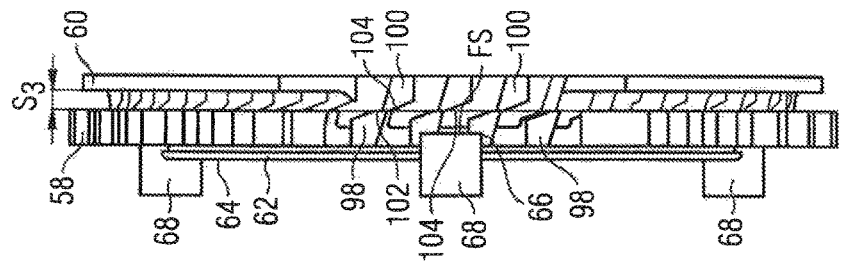
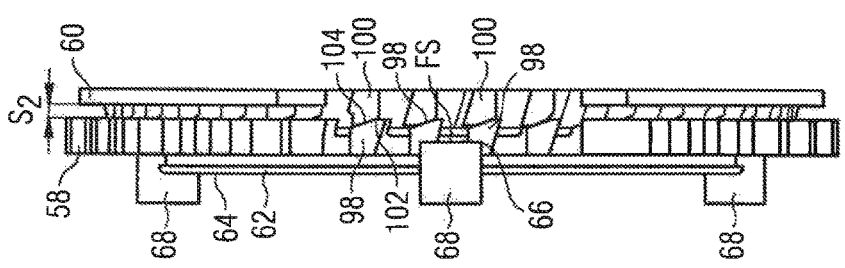
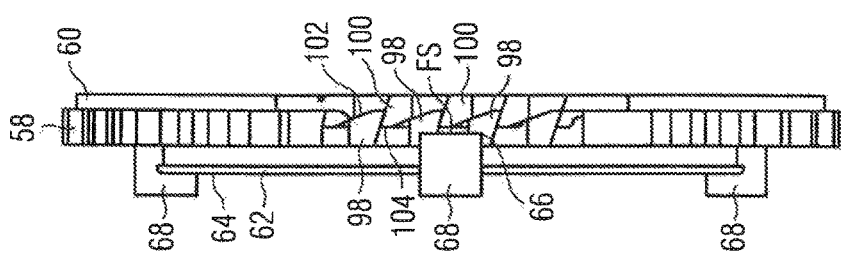

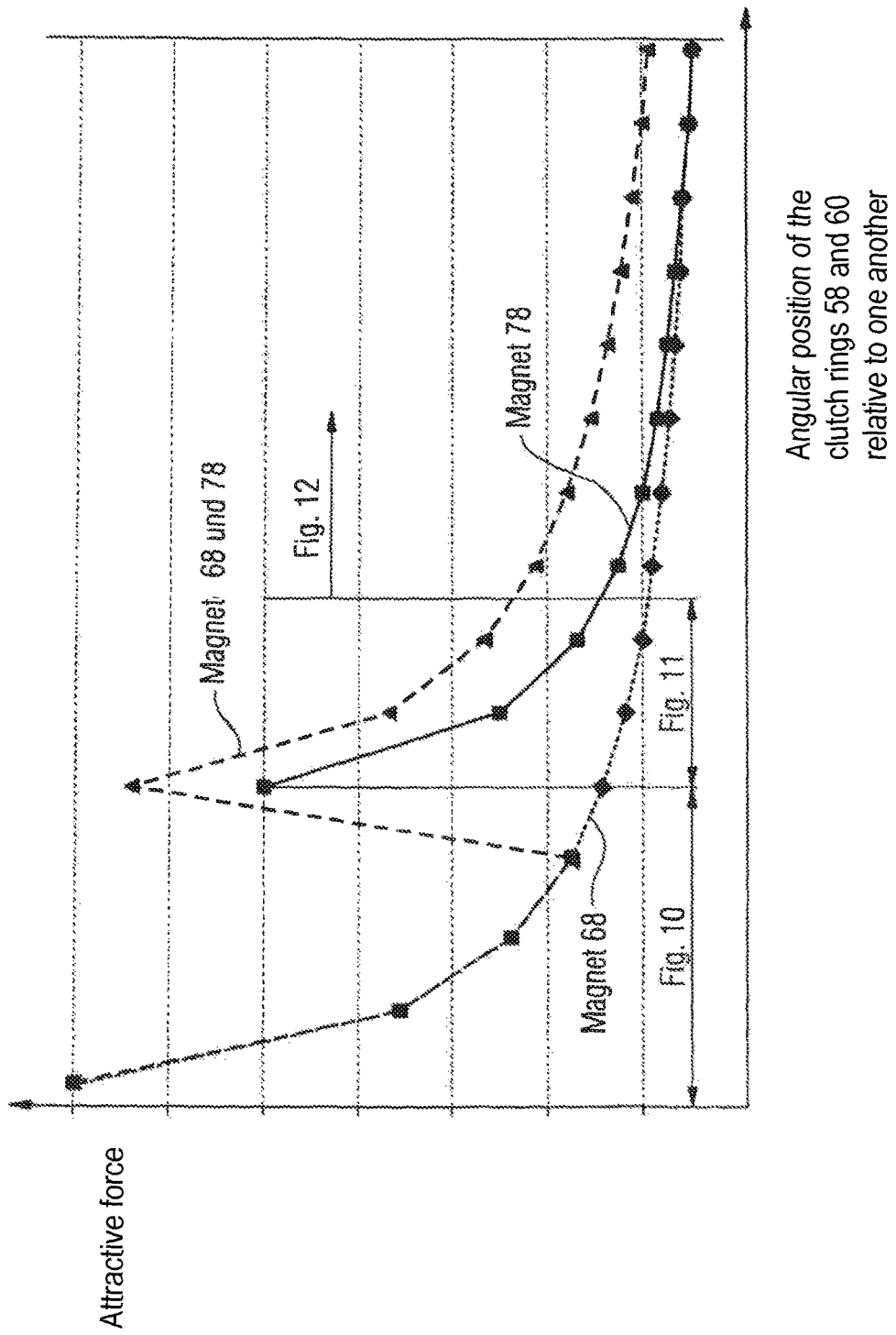

HUB FOR A BICYCLE

This application claims priority to, and/or the benefit of, German patent application DE 10 2015 009 041.0, filed on Jul. 13, 2015.

FIELD OF THE INVENTION

The present invention relates to a hub for a bicycle, having a hub axle, at least one hub sleeve which is mounted rotatably on the hub axle via a bearing arrangement, a driver which is mounted rotatably on the hub axle via a bearing arrangement and is coupleable to the at least one hub sleeve in a torque-transmitting manner, wherein the bearing arrangement has at least one inner bearing and at least one outer bearing.

BACKGROUND

Such bicycle hubs are known from the prior art and disclosed for example in DE 10 2012 016 949 A1. Said document discloses a hub having a hub body and a drive device. The hub body is accommodated rotatably with respect to a fixed axle via bearings. The drive device is mounted rotatably with respect to the fixed axle, likewise via bearings. Provided between the bearings for mounting the drive device is a spacer sleeve which transmits the clamping force from the bearing inner ring of one bearing to the bearing inner ring of the other bearing.

DE 10 2012 016 945 A1 discloses a hub having a hub body that is mounted rotatably with respect to a fixed hub axle via bearings. A drive device is mounted rotatably with respect to the hub axle, likewise via bearings. Between these bearings, or between the bearing inner rings of these bearings, a spacer sleeve is provided.

In the above-described documents of the prior art, the bearings are positioned via spacer sleeves and transmit an axial clamping force from a bearing inner ring via a spacer sleeve to the bearing inner ring of the in each case next bearing. Since there is a (radial) clearance between the bearing inner rings and the hub axle, wear phenomena can occur on the bearings and the axle on account of the increased friction of the bearings.

It is an object of the present invention to provide a hub in which the bearings can be mounted quickly and easily and wear phenomena on the hub axle and the bearings can be prevented.

SUMMARY AND DESCRIPTION

A hub has at least one fastening element. The at least one fastening element fixes at least the inner bearing, in the axial direction, of the bearing arrangement in its predetermined position on the hub axle by a local or sectional enlargement of the cross section of the hub axle.

In one embodiment, the bearings can be plugged onto the axle between the hub axle and the inner ring of the bearings with a clearance fit which is amenable to assembly. Next, at least the inner bearing of the bearing arrangement is fixed in its predetermined position on the hub axle via the fastening element or the local or sectional enlargement of the cross section of the hub axle that is created by the at least one fastening element. In an embodiment, it is accordingly possible to dispense with spacer sleeves and the like for setting the axial spacing between the bearing inner rings of the bearings of a bearing arrangement.

The hub allows quick and easy mounting of the bearing arrangement without incorrect positioning of the bearings being able to occur on account of operator errors.

When at least the inner bearing of the bearing arrangement is fixed in its predetermined position via the at least one fastening element, this making it possible to dispense with spacer sleeves, the spacing between the bearings cannot change in the axial direction, since for example no spacer sleeves can be compressed on account of the clamping force. The axial spacing between the two bearings of the bearing arrangement, or the spacing between the two inner rings of the bearings, is thus not changed or shortened. Thus, bearing damage on account of shortening of the bearing inner ring spacing can be avoided.

According to one embodiment, the at least one fastening element can create a press fit between the hub axle and the at least one inner bearing. In other words, a clearance fit, which is amenable to assembly and tolerances, between the bearings and the hub axle can be converted via the at least one fastening element into a press fit between at least the inner bearing and the hub axle, said press fit ensuring permanent positioning of the inner bearing in its predetermined position.

The at least one fastening element may be configured such that it converts a force acting along the hub axle into a radial enlargement of the cross section of the at least one hub axle. Accordingly, a force acting in the axial direction can be exerted on the at least one fastening element, said force being converted by the at least one fastening element into a local or sectional enlargement of the cross section of the hub axle in the radial direction. This radial enlargement of the cross section of the hub axle serves to fix at least the inner bearing in its predetermined position on the hub axle.

The at least one fastening element may be accommodated in the hub axle so as to be movable in the axial direction. The at least one fastening element can be configured in a substantially tubular manner. The tubular fastening element can extend with its outer circumference along the inner circumference of the hub axle.

The at least one fastening element may be configured such that it is braceable in the axial direction in the hub axle via at least one closure element. The at least one closure element can exert a force, acting in the axial direction, on the at least one fastening element. This force acting in the axial direction can be converted by the at least one fastening element into an enlargement of the cross section in the radial direction. The at least one closure element can serve to secure the at least one driver and/or the axially outer bearing of the bearing arrangement on the hub axle. The at least one fastening element can be in contact at one of its axial ends with the at least one closure element.

According to one embodiment, the hub axle may have a predetermined contour on at least a portion of its inner circumferential surface. The predetermined contour can interact with the at least one fastening element for example in a form-fitting manner in order to fix at least the inner bearing. The at least one closure element can brace the at least one fastening element between itself and the at least one predetermined contour, such that the enlargement of the cross section of the at least one hub axle can be created in this way. The at least one fastening element can have at least one portion which is configured to correspond, i.e. at least sectionally in a form-fitting manner, with the contour on the inner circumferential surface of the hub axle. The at least one portion can be for example an end portion of the at least one fastening element. The end portion can adjoin a tubular portion of the at least one fastening element and be opposite the axial end of the fastening element which is able to be brought into contact with the at least one closure element.

The at least one portion of the fastening element which is configured to correspond to the contour of the inner circumferential surfaces may have an inclined abutment surface. The inclined abutment surface can interact with the at least one contour on the inner circumferential surface in order to enlarge the cross section of the hub axle.

The portion with the inclined abutment surface can narrow the cross section of the at least one fastening element in the radial direction. The at least one portion can accordingly be formed in a conical manner.

According to one embodiment, the predetermined contour on the inner circumferential surface of the hub axle may be a radially inward protruding protrusion having an inclined counterpart abutment surface. The counterpart abutment surface can interact with the abutment surface on the at least one fastening element in order to enlarge the cross section of the hub axle. To this end, the abutment surface of the at least one fastening element can be brought into contact with the counterpart abutment surface of the protrusion on the hub axle. The at least one closure element can brace the at least one fastening element in the axial direction with its abutment surface against the counterpart abutment surface, with the result that the cross section of the hub axle is enlarged and thus the inner bearing is fixed in its predetermined position. The portion of the at least one fastening element with the inclined abutment surface may have an increased wall thickness. In order to be able to enlarge the cross section of the hub axle, the fastening element has to be formed in a relatively rigid manner in particular in the portion that is decisive for enlarging the cross section. This can be achieved with an increase in the wall thickness in the region with the inclined abutment surface.

According to one embodiment, in the unbraced state, the at least one fastening element may protrude from the hub axle in the axial direction by a predetermined portion. This portion, protruding from the hub axle, of the at least one fastening element can interact with the at least one closure element in order to create a force that is necessary to enlarge the cross section of the hub axle. Via the axially protruding portion, the at least one fastening element can be pushed into the hub axle by means of the closure element in order to enlarge the cross section in this way. The at least one closure element can push the fastening element with its protruding portion for example against the radially inward projecting protrusion of the inner circumferential surface. The at least one fastening element is moved further into the hub axle in the axial direction in this case. The abutment surface on the at least one fastening element travels along the at least one counterpart abutment surface on the protrusion of the hub axle.

The at least one fastening element may have an edge which serves to enlarge the cross section. The edge can be formed between the inclined abutment surface and the tubular portion of the fastening element. The edge can travel along the counterpart abutment surface and push the region of the counterpart abutment surface radially outwards. This then ensures that the cross section of the hub axle is widened and thus that at least the inner bearing is fixed. In this way, a press fit is created between the hub axle and the bearing inner ring at least of the inner bearing of the bearing arrangement. The widening can be created by the edge, which, on account of the force exerted on the at least one fastening element, can travel along the counterpart abutment surface of the protrusion on the hub axle.

According to one embodiment, at least one freewheel device having a first clutch ring coupled to the hub sleeve and a second clutch ring coupled to the driver may be provided between the at least one hub sleeve and the driver. The hub may accordingly be a freewheel hub.

Exemplary embodiments are described in the following text with reference to the accompanying figures, in which:

BRIEF DESCRIPTION OF THE DRAWINGS

FIG. 2 shows a sectional view of the hub axle of the freewheel hub according to FIG. 1;

FIG. 3 shows an enlarged detail view of the detail III in FIG. 2;

FIG. 4 shows a partially broken-open perspective view of a clutch device according to the first embodiment;

FIG. 5 shows an enlarged view of the detail V in FIG. 4;

FIG. 6 shows a partially broken-open perspective view of the freewheel hub according to the first embodiment;

FIG. 7 shows an enlarged view of the detail VII in FIG. 6;

FIG. 8 shows a sectional view of the freewheel hub according to the first embodiment;

FIG. 9 shows an enlarged view of the detail IX in FIG. 8;

FIGS. 10 to 12 show sectional views of different positions of the freewheel device of the freewheel hub according to the first embodiment during the transition from the engaged position into the released position;

FIGS. 13 to 15 show enlarged views of the assembly formed by the decoupling ring and the two clutch rings during the transition from the engaged position into the freewheel position;

FIG. 19 shows a diagram of the profile of the attractive force.

DETAILED DESCRIPTION OF THE DRAWINGS

Figure 1:
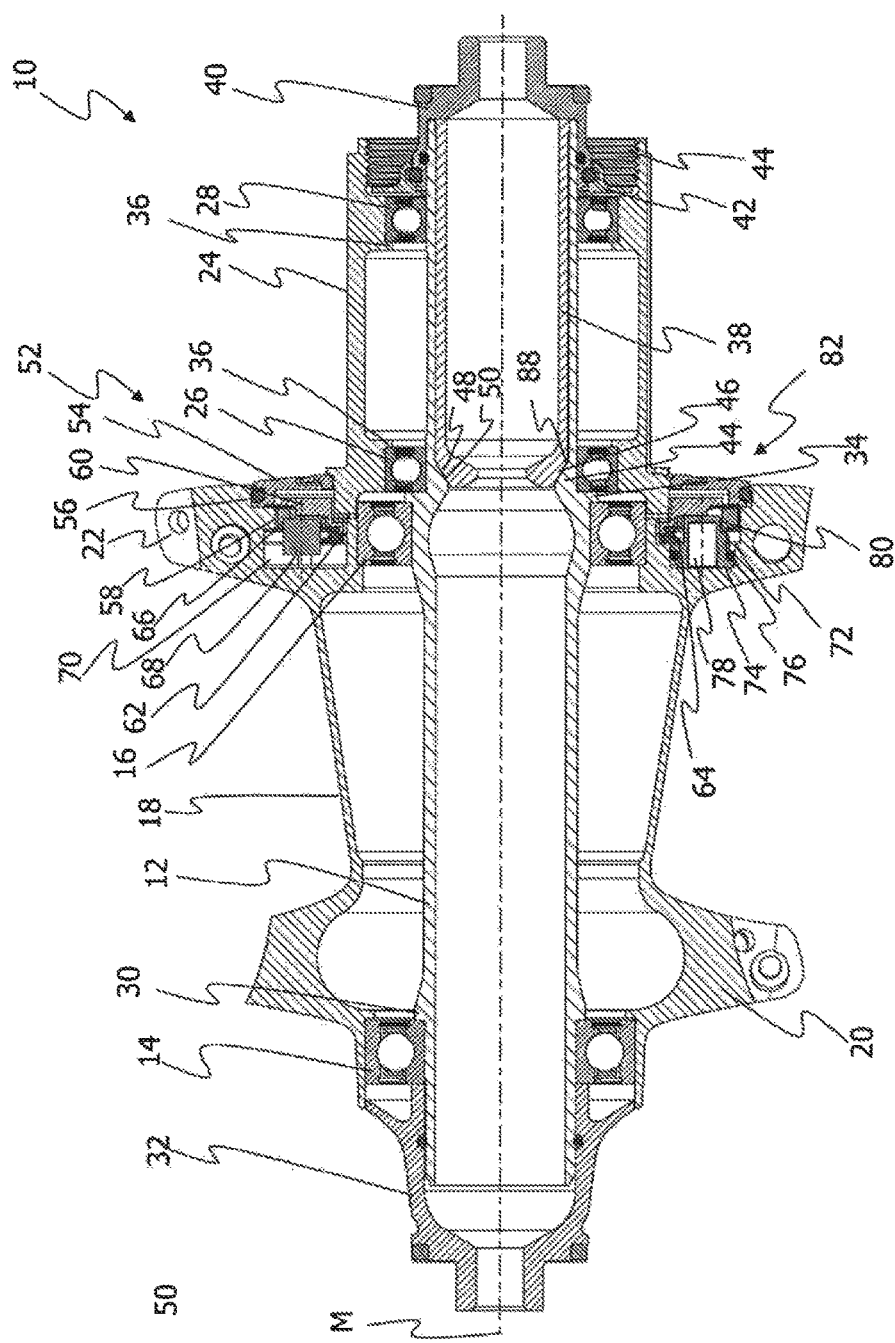
FIG. 1 shows a sectional view, containing the axis, of a freewheel hub according to a first embodiment.

FIG. 1 shows a sectional view, containing the axis, of the freewheel hub according to a first embodiment, wherein the freewheel hub bears the overall designation 10. The longitudinal axis of the freewheel hub 10 bears the overall designation M. The freewheel hub 10 comprises a hub axle 12 into which an axle (not shown) is pluggable by way of quick-action clamping mechanisms via which the hub axle 12 is able to be fixed to a bicycle frame.

A hub sleeve 18 is mounted rotatably on the hub axle 12 via the two rolling bearings 14, 16. The hub sleeve 18 has two spoke flanges 20, 22, to which spokes are attachable in a manner known per se. Furthermore, a driver 24 or a driver sleeve 24 is rotatably mounted on the hub axle 12 via rolling bearings 26 and 28.

The bearing 14 is supported on a protrusion 30 formed on the hub axle 12. The bearing 14 is pressed against the protrusion 30 via a closure element 32 which is plugged onto the hub axle 12. A further protrusion or a step 34 is formed on the axle 12. One of the bearings 16 and 26 is supported on each axial side of this step 34. Radially inward protruding protrusions 36, which serve to support or position the bearings 26 and 28 on the hub axle 12, are provided on the driver sleeve 24. Accommodated in the hub axle 12 is a fastening element 38 which is displaceable in the direction of the axis M and which serves in particular to fix the bearing 26 in its predetermined position via a press fit. The fastening element 38 and the hub axle 12 will be dealt with in more detail again with reference to FIG. 2. The driver sleeve 24 is secured to the hub axle 12 with the bearings 26 and 28 via closure elements 40, 42. To this end, the closure element 40 is plugged onto the hub axle 12 and is clamped with a quick-release clamp. A portion 44 having an internal thread is discernible on the driver sleeve 24, said portion serving to fasten a sprocket arrangement (not shown in FIG. 1) to the hub sleeve 24.

If the closure element 40 is plugged onto the hub axle 12, the fastening element 38 is displaced along the axis M to a radially inward protruding protrusion 46 on the hub axle 12 and is pressed against this protrusion. The protrusion 44 has an abutment surface 46 that extends in an inclined or oblique manner to the axis M and points substantially towards the closure element 40. The fastening element 38 has an end portion 48 which narrows or constricts the diameter of the fastening element 38. The end portion 48 is thus configured in a conical manner. Provided on this end portion 48 is an inclined abutment surface 50, which can be brought into contact with the abutment surface 46 on the protrusion 40 of the hub axle 12. The abutment surface 46 of the protrusion 44 forms a counterpart abutment surface for the abutment surface 50 of the fastening element 38. The fastening element 38 is clamped against the protrusion 44 or the abutment surface 46 when the closure element 40 is screwed together with the hub sleeve 12. The fastening element 38 can thus convert a force exerted axially on the fastening element 38 into a radial enlargement of the cross section of the hub axle 12. As a result, depending on the inclination angles of the abutment surfaces 46 and 50, the cross section of the hub axle 12 is enlarged or widened in sections or at points in the radial direction. As a result of this widening, the outside diameter of the hub axle is increased. The increase in the diameter or outside diameter of the hub axle 12 has the result that a press fit is established between the bearing 26 and the outer circumference of the hub axle 12. As a result, the bearing 26 is fixed in its predetermined position on the hub axle 12 in the radial direction. The bearing 26 cannot loosen as a result of the established press fit and the spacing between the bearings 26 and 28 can be fixed permanently without specific measures having to be taken to maintain the spacing during assembly. In particular, it is possible to dispense with the spacer sleeves, known from the prior art, between the bearings 26 and 28. As a result of the permanent fixing of the spacing between the bearing 26 and the bearing 28 on the hub axle, bearing damage and wear phenomena on the axle and on the bearings are avoided.

The freewheel device 52 is discernible between the driver sleeve 24 and the hub sleeve 18. The freewheel device 52 is closed off from the environment via closure elements 54 which extend between the hub sleeve 18 and the driver sleeve 24, and is also sealed off via a sealing ring 56. The freewheel device 52 is accommodated in the hub sleeve 18. The freewheel device 52 comprises a first clutch ring 58 and a second clutch ring 60. The second clutch ring 60 is connected to a decoupling ring 62. The connection between the decoupling ring 62 and the second clutch ring 60 can be established for example via a latching connection or a snap-action connection. The decoupling ring 62 can be produced from plastics material. The decoupling ring 62 is intended to prevent the clutch rings 58 and 60 from striking the hub sleeve in the axial direction. This striking of the hub sleeve 18 can result in undesired oscillations and the production of noise. The decoupling ring 62 thus decouples the clutch rings 58 and 60 from the hub sleeve 18 in terms of vibration or acoustically in the axial direction. The first clutch ring 58 can be moved in a relative manner both in the axial direction and in the circumferential direction with its inner circumference on the second clutch ring 60 and the decoupling ring 62. In other words, the first clutch ring 58 can slide with its inner circumference on the decoupling ring 62 and the second clutch ring 60. The decoupling ring 62 has a radially outwardly protruding protrusion 64, via which the first clutch ring 58 is held on the decoupling ring 62 and the second clutch ring 60.

The first clutch ring 58, the second clutch ring 60 and the decoupling ring 62 form a separate assembly, which is arranged in a movable manner on the hub sleeve 18. The second clutch ring 60 connected to the decoupling ring 62 can move together with the decoupling ring 62 in the axial direction relative to the first clutch ring 58. As already mentioned above, the first clutch ring 58 can also move relative to the second clutch ring 60 and the decoupling ring 62.

The first clutch ring 58 has apertures 66 which are profiled in a stepped manner and into which magnets 68 are inserted and held via the stepped profiling. The magnets 68 can be configured as cylindrical or bar magnets. The form of the apertures 66 matches the shape of the magnets 68. The magnets 68 extend in sections in a recess 70 in the hub sleeve 18. Accommodated in a further recess 72 in the hub sleeve 18 are guide sleeves 74 which are mounted elastically in the recess 72 in the hub sleeve 18 via an elastic element 76. The guide sleeves 74 can be produced from a material which is usually used for plain bearings. Magnets 78 are accommodated in the guide sleeves 74. The magnets 78 can likewise be configured as cylindrical or bar magnets. The first clutch ring 58 has a recess 80 for receiving the guide sleeves 74 in sections. The first clutch ring 58 is mounted on the guide sleeves 74 so as to be displaceable in the axial direction. The guidance via the guide sleeves 74 and the connection between the first clutch ring 58 and the hub sleeve 18 via the guide sleeves 74 ensures acoustic decoupling between the freewheel device 52 and the hub sleeve 18 in the axial and radial direction, since a predetermined spacing can be set in the radial direction between the hub sleeve 18 and the first clutch ring 58 via the guide sleeves 74.

The guide sleeves 74 and the decoupling ring 62 together form a decoupling device 82 which decouples the freewheel device 52 from the hub sleeve 18 in terms of vibration. The guide sleeve 74 and the decoupling ring 62 prevent the clutch rings 58 and 60 of the freewheel device 52 from striking the hub sleeve 18 in the axial direction. In the freewheel mode of the freewheel hub 10, in particular the guide sleeve 74 prevents the first clutch ring 58 from striking the hub sleeve 18 in the radial direction and in the circumferential direction.

FIG. 2 shows a sectional view of the hub axle 12 with the fastening element 38. The radially outwardly projecting protrusions 30 and 34, which serve for abutment of the bearings 14, 16, 26 of the freewheel hub 10 (see FIG. 1), are discernible on the hub axle 12. A bearing seat $LS_1$ for fastening the bearing 14 (see FIG. 1) is discernible to the left of the protrusion 30 in the axial direction. Bearing seats $LS_2$ and $LS_3$, which serve to fasten the bearings 16 and 26, are likewise discernible to the left and right of the protrusion, or of the step 34, in the axial direction. A further bearing seat $LS_4$ is discernible to the left of a press-fit portion 84 in the axial direction. In the region of the bearing seats $LS_1$ to $LS_4$, the hub axle 12 has a slightly enlarged outside diameter compared with the remaining portions thereof.

The fastening element 38 is accommodated in the hub axle 12 so as to be displaceable in the direction of the axis M. The fastening element 38 has a tubular portion 86 which extends along the inner circumferential surface of the hub axle 12. Formed at the transition from the tubular portion 86 to the end portion 48 is an edge 88 which, together with the abutment surface 50 of the fastening element 48, widens the cross section of the hub axle 12 in the region of the abutment surface 46 on the protrusion 44 of the hub axle 12. The fastening element 38 bears, with its abutment surface 50 extending in an inclined manner with respect to the axis M, against the abutment surface 46, extending in an inclined manner with respect to the axis M, of the radially inward projecting protrusion 44 on the hub axle 12. The end portion 48 is configured in a conical manner. Compared with the remaining wall thickness of the fastening element 38 in the tubular portion 86, the end portion 48 has an increased wall thickness. This increased wall thickness and the associated greater rigidity of the end portion 48 ensures that, via the end portion 48, the outer circumference of the hub sleeve 18 can be increased in the region of the bearing seat $LS_3$. If a force that acts in the axial direction is exerted on the fastening element 38 via the closure element 40, the fastening element 38 is pressed with its abutment surface 50 against the counterpart abutment surface 46 of the protrusion 44. On account of the axial force, the fastening element 38 travels with its conical end portion 48 or the abutment surface 50 in the axial direction along the counterpart abutment surface 46. As soon as the edge 88 of the fastening element 38 reaches the region of the counterpart abutment surface 46, the cross section of the hub axle 12 is widened in the radial direction in the region of the bearing seat $LS_3$. As a result, a press fit is created between the hub axle 12 and the inner ring of the bearing 26.

FIG. 3 shows an enlarged view of the detail III in FIG. 2. It is clear from FIG. 3 that a portion 90 of the fastening element 38 protrudes in the unloaded state from the hub axle 12 by a predetermined distance s in the axial direction. This is necessary in order that an axial force can be exerted on the fastening element 38 via the closure element 40 (see FIG. 1), the fastening element 38 being pushed in the axial direction against the protrusion 44 on the inner circumferential surface of the hub axle 12 by said axial force. The force exerted on the fastening element 38 via the closure element 40 is transmitted to the abutment surface 46 of the protrusion 44 via the end portion 48 of the fastening element 38 with its counterpart abutment surface 50, and is converted into a radial widening of the circumference of the hub axle 12 in the region of the bearing seat $LS_3$.

FIG. 4 shows a partially broken-open view of the freewheel hub 10. The hub sleeve 18 has the spoke flanges 20 and 22. Shown between the hub sleeve 18 and the driver sleeve 24 is the freewheel device 52, which is provided in the region of the spoke flange 22 in the hub sleeve 18. Radially outwardly protruding protrusions 92, which allow a sprocket arrangement (not shown) to be slid on in the axial direction, are discernible on the driver sleeve 24. Furthermore, the internal thread portion 44, which is intended for fastening a sprocket arrangement (not shown), is discernible in FIG. 4.

The first clutch ring 58 and the second clutch ring 60 are likewise discernible in FIG. 4. A radial external tooth set 94 is provided on the first clutch ring 58 and the hub sleeve 18 has a corresponding radial internal tooth set 96.

FIG. 5 shows an enlarged view of the detail V in FIG. 4. The freewheel device 52 is discernible in FIG. 5. The freewheel device 52 comprises the first clutch ring 58 and the second clutch ring 60. Both the first clutch ring 58 and the second clutch ring 60 have axial tooth sets directed towards one another. The axial tooth set of the first clutch ring 58 has the axial teeth 98. The axial tooth set of the second clutch ring 60 has the axial teeth 100. The teeth 98 and 100 each have sliding surfaces 102 and 104 on which the teeth 98 and 100 can slide against one another as soon as a relative rotation takes place between the first clutch ring 58 and the second clutch ring 60. According to FIG. 5, the freewheel device 52 is in its engaged position, i.e. the first clutch ring 58 and the second clutch ring 60 are engaged with one another in a torque-transmitting manner. This is discernible in particular at the locations indicated by the arrow ES, which show the teeth 98 of the first clutch ring 58 engaged with the teeth 100 of the second clutch ring 60.

The first clutch ring 58 has apertures 66 for receiving magnets 68. The magnets 68 extend in sections in a recess 70 in the hub sleeve 18. The first clutch ring 58 furthermore has a further recess 80 for receiving a guide portion 106 of the guide sleeve 74. The fastening portion 108 of the guide sleeve 74 adjoins the guide portion 106. The fastening portion 108 is received elastically in the recess 72 in the hub sleeve 18 via an elastic element 76. The elastic element 76 can be configured for example in an annular manner.

The second clutch ring 60 furthermore has recesses 110 which are provided on the clutch ring 60 in a manner distributed in the circumferential direction.

FIG. 6 again shows a partially broken-open perspective view of the clutch device 10, which corresponds substantially to the above-described FIG. 4. The essential differences between FIG. 4 and FIG. 6 can be seen in the detail VII. The detail VII is dealt with in detail in the following text with reference to FIG. 7.

FIG. 7 shows an enlarged view of the detail VII in FIG. 6. The essential difference between the detail VII shown in FIG. 7 and the detail V shown in FIG. 5 is that relative rotation has taken place between the first clutch ring 58 and the second clutch ring 60. As a result of this relative rotation, the first clutch ring 58 and the second clutch ring 60 were separated and, according to FIG. 7, are now in the freewheel position, as can be seen in particular at the locations indicated by the arrows FS.

The teeth 98 of the first clutch ring 58 and the teeth 100 of the second clutch ring 60 are no longer engaged with one another, such that the freewheel hub is in the freewheel mode, in which relative rotation between the hub sleeve 18, with the wheel attached thereto, and the driver sleeve 24 can take place. In the freewheel mode, the hub sleeve 18 with the wheel attached thereto usually rotates more quickly than the driver sleeve 24.

FIG. 8 shows a sectional view of the freewheel hub 10. The radial tooth sets 94 and 96 of the first clutch ring 58 and of the hub sleeve 18, which are engaged with one another in a torque-transmitting manner in the drive direction, are discernible in FIG. 8. The teeth 100 of the second clutch ring 60 are engaged with the teeth 98 of the first clutch ring 58. Of the teeth 98 of the first clutch ring 58, only portions of the sliding surfaces 102 are discernible. The second clutch ring 60 has a radial tooth set 112 which is engaged with a radial tooth set 114 on the driver sleeve 24 in a torque-transmitting manner. The radial tooth set 94 of the first clutch ring 58 and the radial tooth set 96 of the hub sleeve 18 are decoupled from one another in terms of vibration in the circumferential direction. To this end, an air gap is set between the radial tooth sets 94 and 96 in the freewheel mode. This air gap is set by the guide sleeves (not shown in FIG. 8). In the drive direction, the teeth of the radial tooth sets 94 and 96 bear against one another for torque transmission, as can be seen in FIG. 8.

FIG. 9 shows an enlarged view of the detail IX in FIG. 8. The teeth 100 of the second clutch ring 60 are engaged with the teeth 98 of the first clutch ring 58. The radial tooth sets 112 and 114 of the driver sleeve 24 and of the second clutch ring 60 are likewise engaged with one another in a torque-transmitting manner.

In the following text, the transfer of the freewheel device 52 from the engaged position into the freewheel position is described with reference to FIGS. 10 to 12.

FIG. 10 shows the freewheel device 52, or the freewheel hub, in the engaged position, i.e. the clutch rings 58 and 60 are engaged with one another in a torque-transmitting manner. Formed on the guide sleeve 74, or the guide portion 104 thereof, is a shoulder 116. Between this shoulder 116 and the first clutch ring 58, a predetermined gap $s_1$ is set in the engaged position of the clutch rings 58 and 60. In the engaged position, the decoupling ring 62, which is connected to the second clutch ring 60, bears against an abutment surface 118 of the guide sleeve 74. The decoupling ring 62 slides on the hub sleeve 18 with its inner circumference.

In the position shown in FIG. 10, only the magnet 68 is "active". This means that only the attractive force of the magnet 68 acts on the clutch rings 58 and 60.

In order to trigger the transfer from the engaged position into the freewheel position of the freewheel device, a relative movement or relative rotation between the hub sleeve 18 and the driver sleeve 24 has to take place. As a result of this relative rotation between the hub sleeve 18 and the driver sleeve 24, the clutch rings 54 and 60 can be separated from one another.

FIG. 11 shows an intermediate position of the freewheel device 52 between the engaged position and the freewheel position. In this intermediate position, the teeth of the clutch rings 58 and 60 still overlap to a certain degree.

In FIG. 11, the gap $s_1$ (FIG. 10) has been closed and the first clutch ring 58 bears against the shoulder 116. The decoupling ring 62 still bears against the abutment surface 118. Compared with FIG. 10, the first clutch ring 58 has accordingly moved towards the left, in order to come into abutment with the shoulder 116. The displacement of the first clutch ring 58 to the left for abutment with the shoulder 116 on the guide sleeve 74 is brought about by the relative movement between the first clutch ring 58 and the second clutch ring 60, during which the sliding surfaces 102 and 104 of the teeth 98 and 100 of the clutch rings 58 and 60 slide against one another (FIGS. 4 to 7). As a result of this sliding movement, the first clutch ring 58 is displaced towards the left, since the second clutch ring 60 is kept in abutment with the abutment surface 118 of the guide sleeve 74 via the decoupling ring 62 on account of the attractive force of the magnets 78 in the guide sleeve 74. The movement of the first clutch ring 58 to the left takes place counter to the attractive force of the magnets 68 in the first clutch ring 58, since the magnets 68 try to pull the clutch rings 58 and 60 together by way of their attractive force. As a result of the movement of the first clutch ring 58 to the left, a gap $s_2$ is set between the first clutch ring 58 and the second clutch ring 60, i.e. the clutch rings 58 and 60 are already partially separated in the axial direction.

FIG. 12 shows the freewheel device 52 in the freewheel position, i.e. the first clutch ring 58 and the second clutch ring 60 are not engaged in a torque-transmitting manner.

Compared with FIG. 11, the axial spacing between the first clutch ring 58 and the second clutch ring 60 has increased further. In FIG. 12, the larger spacing is now denoted $s_3$. The axial tooth sets 98, 100 of the first clutch ring 58 and of the second clutch ring 60, of which only the tooth 100 of the second clutch ring 60 is shown, have been completely separated from one another.

When FIG. 11 and FIG. 12 are compared, it is clear that the second clutch ring 60 with the decoupling ring 62 has moved to the right relative to the first clutch ring 58 in FIG. 12. The first clutch ring 58 is still on the shoulder 116 of the guide sleeve 74, but the decoupling ring 62 no longer bears against the abutment surface 118. As a result, the spacing $s_3$ between the first clutch ring 58 and the second clutch ring 60 is set.

The radial protrusion 64 on the decoupling ring 62 is furthermore discernible in FIGS. 10 to 12, said radial protrusion 64 serving to keep the first clutch ring 58 on the unit formed by the second clutch ring 60 and the decoupling ring 62 and nevertheless to allow a relative movement between the first clutch ring 58 and the second clutch ring 60 with the decoupling ring 62. The protrusion 64 and the second clutch ring 60 enclose the first clutch ring 58 between one another.

It is furthermore apparent from FIGS. 10 to 12 that the guide sleeve 74, with its shoulder 116 and the abutment surface 118, prevents the clutch rings 58 and 60 from being able to strike the hub sleeve 18 directly during the transition into the freewheel position and also back into the engaged position. To this end, the guide sleeve 74 also interacts with the decoupling ring 62, which can be supported on the abutment surface 118. This prevents oscillations or vibrations that occur during the transition of the clutch rings into the freewheel position or back into the engaged position from being able to be transmitted to the hub sleeve 18.

FIG. 19 shows a diagram of the attractive forces of the magnets 68 and 78, said attractive forces changing depending on the angular positions of the clutch rings 58 and 60.

The individual curves shown in FIG. 19 can be assigned to the attractive forces of the magnet 68, of the magnet 78 and of the two magnets 68 and 78 depending on the positions, shown in FIGS. 10 to 12, of the clutch rings 58 and 60.

In the position shown in FIG. 10, only the magnet 68 on the first clutch ring 58 acts on the second clutch ring 60 with its attractive force and keeps the clutch rings 58 and 60 initially against one another. The curve of the summed attractive forces of the magnets 68 and 78 thus corresponds, in the portion "FIG. 10" of the diagram according to FIG. 19, only to the attractive force provided by the magnet 68, since the magnetic force of the magnet 78 is not yet acting on the clutch rings 58 and 60.

If the clutch rings 58 and 60 are rotated relative to one another during the transition into the freewheel position, the attractive force, acting on the second clutch ring 60, of the magnet 68 drops.

In the intermediate position shown in FIG. 11, the clutch rings 58 and 60 have been rotated relative to one another such that the magnet 78 also acts on the clutch rings 58 and 60 with a relatively large attractive force (see region "FIG. 11" in FIG. 19). Accordingly, the attractive force provided by the two magnets 68 and 78 is also initially relatively large again in the portion "FIG. 11". The attractive force of the magnets 68 and 78 then drops relatively greatly, however, the further the clutch rings 58 and 60 are rotated relative to one another. The clutch rings 58 and 60 are held against one another by the two magnets 68 and 78, although the first clutch ring 58 has been displaced towards the left in FIG. 11 and bears against the shoulder 116. As a result, the gap $s_2$ (FIG. 11) between the first clutch ring 58 and the second clutch ring 60 is formed. The clutch rings 58 and 60 are thus already partially separated in the axial direction (see gap $s_2$).

If the clutch rings 58 and 60 are rotated further with respect to one another and thus the axial spacing (gap $s_3$) between the two clutch rings 58 and 60 increases, both the attractive force of the magnet 68 and the attractive force of the magnet 78 is reduced, as is discernible in the portion marked "FIG. 12" of the diagram according to FIG. 19. The attractive forces of the magnets 68 and 78 drop further in a corresponding manner until the clutch rings 58 and 60 reach a predetermined angular position relative to one another. In this predetermined angular position of the clutch rings 58 and 60, the clutch rings 58 and 60 are also completely separated in the axial direction. This corresponds to the state shown in FIG. 12. In FIG. 12, the decoupling ring 62 has been lifted from the abutment surface 118 on the guide sleeve 74, such that the gap $s_3$ between the clutch rings 58 and 60 is formed. In FIG. 12, the two clutch rings have been completely separated from one another. Thus, the freewheel device 52 is in the freewheel position.

It is clear from FIG. 19, that the attractive forces of the magnets 68 and 78 change relative to one another depending on the angular positions of the clutch rings 58 and 60.

The freewheel device 52 ensures high magnetic attractive forces, which keep the clutch rings 58 and 60 against one another, but at the same time, on account of the strong drop in the attractive forces of the magnets 68 and 78 (see FIG. 19) with the changing angular positions of the clutch rings 58 and 60, allows rapid separation of the clutch rings 58 and 60 at the transition into the freewheel position.

Consideration should be given here to the fact that, in the freewheel position (FIG. 12), too, depending on the angular positions of the clutch rings 58 and 60 relative to one another, virtually the high attractive forces shown in FIG. 19 act on the second clutch ring 60, wherein the attractive forces are somewhat lower than the illustrated attractive forces on account of the axial spacing between the clutch rings in the freewheel position. As a result of these relative large attractive forces, the clutch rings 58 and 60 can also be transferred quickly from the freewheel position back into the engaged position, in which they are engaged with one another in a torque-transmitting manner. In other words, large attractive forces act on the second clutch ring 60 in predetermined angular positions of the clutch rings 58 and 60 relative to one another, and lower attractive forces in other predetermined angular positions. Given a continuous relative rotation of the clutch rings 58 and 60 in the freewheel position, this has the effect that the curves shown in FIG. 19 or similar curves of the attractive forces occur in large numbers one after another when the clutch rings 58 and 60 can rotate relative to one another in the freewheel position.

FIGS. 13 to 15 show views of the first clutch ring 58 and of the second clutch ring 60 with the decoupling ring 62 during the transition from the engaged position into the released position. The positions of the clutch rings 58 and 60 in FIGS. 13 to 15 correspond substantially to the positions shown in FIGS. 10 to 12 of the freewheel device 52.

The first clutch ring 58 with the magnets 68 is discernible in FIG. 13. The magnets 68 are accommodated in apertures 66 in the first clutch ring 58. The apertures 66 are configured between two adjacent teeth 98 in the first clutch ring 58. The functioning of the teeth 98 of the first clutch ring 58 is not impaired by the apertures 66 and the magnets 68. The second clutch ring 60 is connected to the decoupling ring 62. The decoupling ring 62 has a circumferential protrusion 64 which keeps the first clutch ring 58 on the unit made up of the decoupling ring 62 and second clutch ring 60.

The teeth 98 of the first clutch ring 58 have a sliding surface 102. The teeth 100 of the second clutch ring 60 similarly have a sliding surface 104. In the engaged position shown in FIG. 13, a sliding surface 102, 104 of a tooth 98 or 100 substantially spans the intermediate space between two adjacent teeth 98 or 100. A tooth 100 accordingly also spans, with its sliding surface 104, the surface portion FS of the magnet 68 which is exposed by the aperture 66 between two adjacent teeth 98. In other words, the surface portion FS, exposed by the aperture 66, of the magnet 68 accommodated in the aperture 66 corresponds in terms of area substantially to the sliding surface 104 of the tooth 100 of the second clutch ring 60.

FIG. 14 shows an intermediate position between the engaged position and the freewheel position. According to FIG. 14, a relative movement in the axial direction and at the same time a relative rotation between the first clutch ring 58 and the second clutch ring 60 has taken place. This occurs for example when the hub sleeve 18 (FIG. 1) with the first clutch ring 58 rotates more quickly than the driver sleeve 24 (FIG. 1) with the second clutch ring 60. In other words, in most cases, in which the freewheel hub 10 passes into the freewheel mode, no force is transmitted to the driver sleeve 24 via the chain drive—the chain drive is stationary—, wherein the hub sleeve continues to rotate with the first clutch ring 58. As a result of this relative rotation between the first clutch ring 58 and the second clutch ring 60, the sliding surfaces 102 and 104 of the teeth 98 and 100 slide against one another. As a result of the inclination of the sliding surfaces 102 and 104, the clutch rings 58 and 60 are separated in the axial direction during a corresponding relative rotation and the sliding of the sliding surfaces 102 and 104 against one another. The increasing axial spacing between the first clutch ring 58 and the second clutch ring 60 is again denoted $s_2$ in FIG. 14. In the position shown in FIG. 14, no tooth 100 of the second clutch ring 60 is located in the axial direction in front of the surface portion FS of the magnet 68. The magnetic attractive force exerted on the second clutch ring 60 by the magnet 68 in the first clutch ring 58 is accordingly low. If a tooth 100 is located with its sliding surface 104 immediately in front of the surface portion FS, the magnetic attractive force, exerted on the tooth 100, of the magnet 68 is relatively large. It is clear therefrom that the magnetic attractive force exerted on the second clutch ring 60 by the magnet 68 in the first clutch ring 58 changes depending on the angular positions of the first clutch ring 58 and of the second clutch ring 60 relative to one another. The reason for this is that the field lines of the magnetic field of the magnets 68 can emerge in an unimpeded manner in the direction of the second clutch ring 60 only from the surface portion FS. In all other regions, the magnetic field first of all has to propagate through the adjacent teeth 98 of the clutch ring 58 and is accordingly weaker.

FIG. 15 shows the first clutch ring 58 and the second clutch ring 60 in the freewheel position. The spacing $s_3$ between the first clutch ring 58 and the second clutch ring 60 has increased further compared with the spacing $s_2$ according to FIG. 14. The first clutch ring 58 bears virtually against the radial protrusion 64 on the decoupling ring 62. The sliding surfaces 102 and 104 have slid further against one another, with the result that the first clutch ring 58 and the second clutch ring 60 have been spaced further apart in the axial direction (see s₃). It is clear from FIG. 15 that a tooth 100 of the second clutch ring 60, although spaced apart from one another in the axial direction, is located in the axial direction in front of the surface portion FS of the magnet 68. In this position of the clutch rings 58 and 60, the magnetic attractive force exerted on the tooth 100 by the magnet 68 is again very large, since the tooth 100, or its sliding surface 104, virtually completely overlaps the surface portion FS of the magnet 68 which is exposed by the aperture 66. In this case, the magnetic field from the surface portion FS can act directly on the tooth 100 of the second clutch ring 60.

This has the advantage that the transition from the freewheel position shown in FIG. 15 into the engaged position shown in FIG. 13 can take place quickly on account of the high attractive force exerted on the teeth 100 of the second clutch ring 60 by the magnets 68. In the event of a relative rotation between the first clutch ring 58 and the second clutch ring 60, the attractive force, acting on the second clutch ring 60, of the magnets 68 can be switched on and off, so to speak. As stated above, the reason for this is that the magnetic field can change as a result of the different angular positions of the first clutch ring 58 relative to the second clutch ring 60. In the angular position, shown in FIG. 15, of the clutch rings 58 and 60, a large attractive force acts on the tooth 100 of the second clutch ring, since the tooth 100 completely overlaps the surface portion FS and the magnetic field can act directly on the tooth 100. The strong attractive force in this angular position ensures that, in the event of a relative rotation in the opposite direction between the first clutch ring 58 and the second clutch ring 60, the axial spacing between the first clutch ring 58 and the second clutch ring 60 is closed and the teeth 98 and 100 pass quickly and reliably into engagement with one another.

If FIGS. 13 to 15 are considered in the reverse order, FIGS. 13 to 15 also show the transition from the freewheel position according to FIG. 15 into the engaged position according to FIG. 13. In other words, in the event of a reverse relative rotation, the clutch rings 58 and 60 are pulled together by the magnets 68. The sliding surfaces 102 and 104 of the teeth 98 and 100 slide against one another until they are fully engaged in a torque-transmitting manner.

Figure 16:
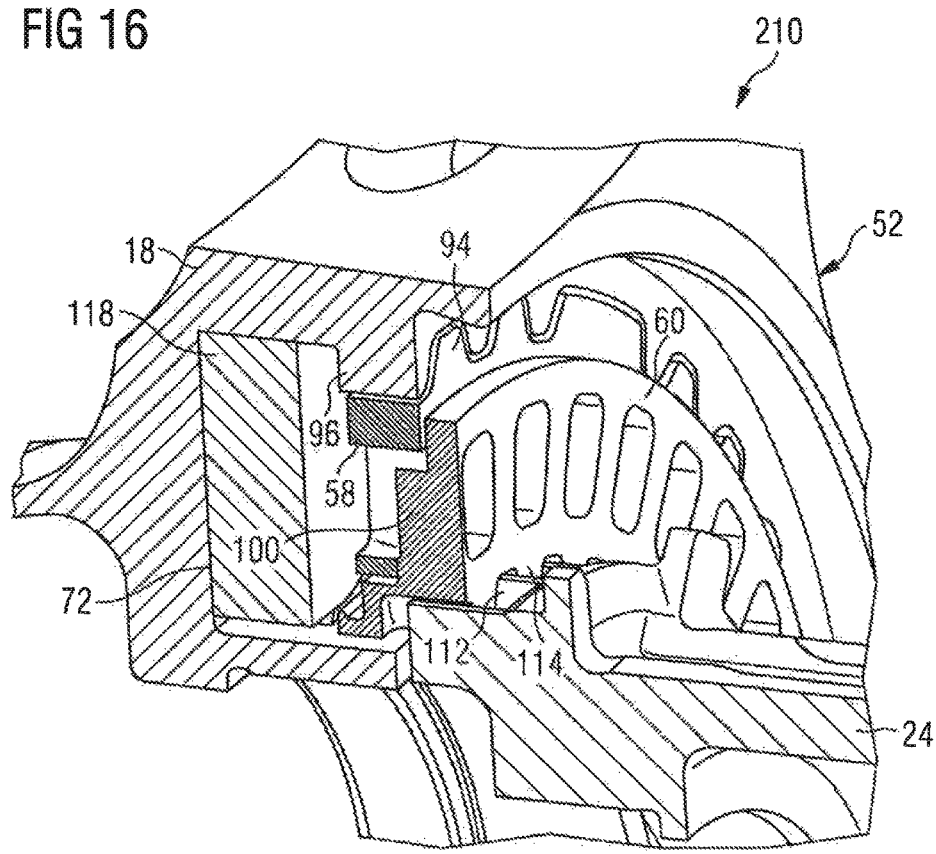
FIG. 16 shows a front view of a freewheel hub according to a second embodiment.

FIG. 16 shows a partially broken-open perspective view of a freewheel hub 210 according to a second embodiment. The same reference signs as in the first embodiment are used for components that are of the same type or have the same effect.

The freewheel hub 210 has a hub sleeve 18 and a driver sleeve 24. The freewheel device 52 is provided between the hub sleeve 18 and the driver sleeve 24. The freewheel device 52 comprises the first clutch ring 58 and the second clutch ring 60. The driver sleeve 24 is engaged in a torque-transmitting manner via its radial tooth set 112 with the radial tooth set 114 of the second clutch ring 60. The same goes for the hub sleeve 18 and the first clutch ring 58. The hub sleeve 18 has a radially inward directed radial tooth set 96, which is engaged in a torque-transmitting manner with the radially outwardly directed radial tooth set 94 of the first clutch ring 58.

The hub sleeve 18 also has recesses 72. A sound-reducing element 120 is accommodated in the recesses 72 in FIG. 18. The sound-reducing elements 120 can be sound-absorbing elements or sound-deadening elements. The sound-absorbing elements 120 can be pressed easily into the recess 72.

Figure 17:
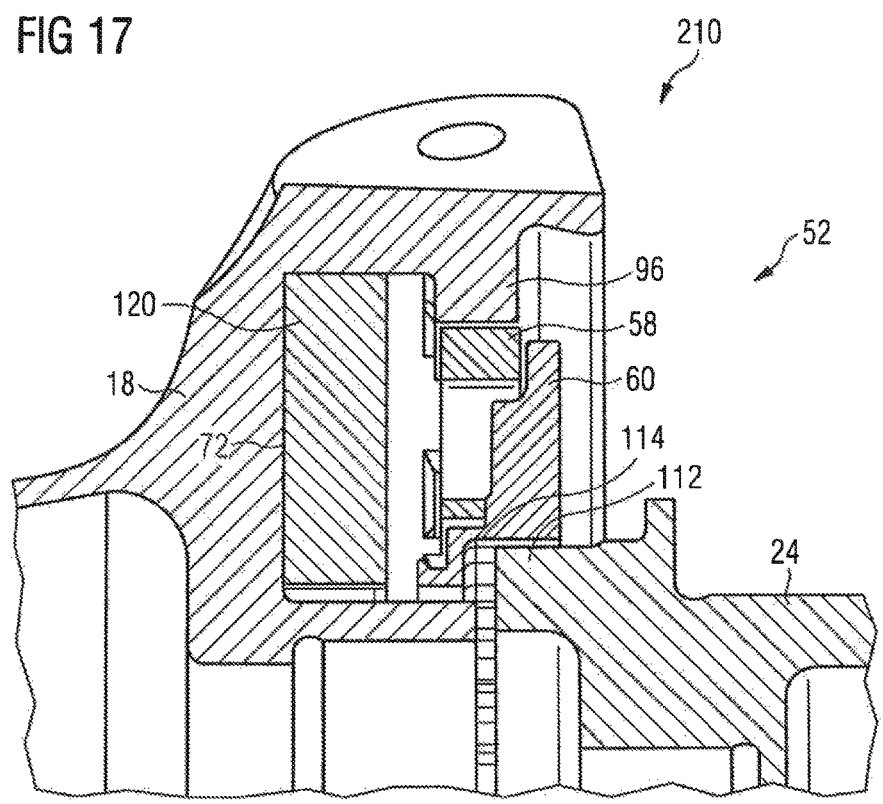
FIG. 17 shows a sectional view of the freewheel hub according to the second embodiment.

FIG. 17 shows a sectional view of the freewheel hub 210. In the view according to FIG. 17, the sound-absorbing or sound-deadening element 120 which is accommodated in the recess 72 in the hub sleeve 18 is again discernible. The element 120 for sound deadening or sound absorption is located in the immediate vicinity of the first clutch ring 58 and of the second clutch ring 60, which can emit unpleasant noise during transfer from the freewheel position into the engaged position. This noise is absorbed or deadened by the sound-absorbing or sound-deadening element 120 and thus does not pass outwards in order to have a negative effect on the driver and his environment.

Figure 18:
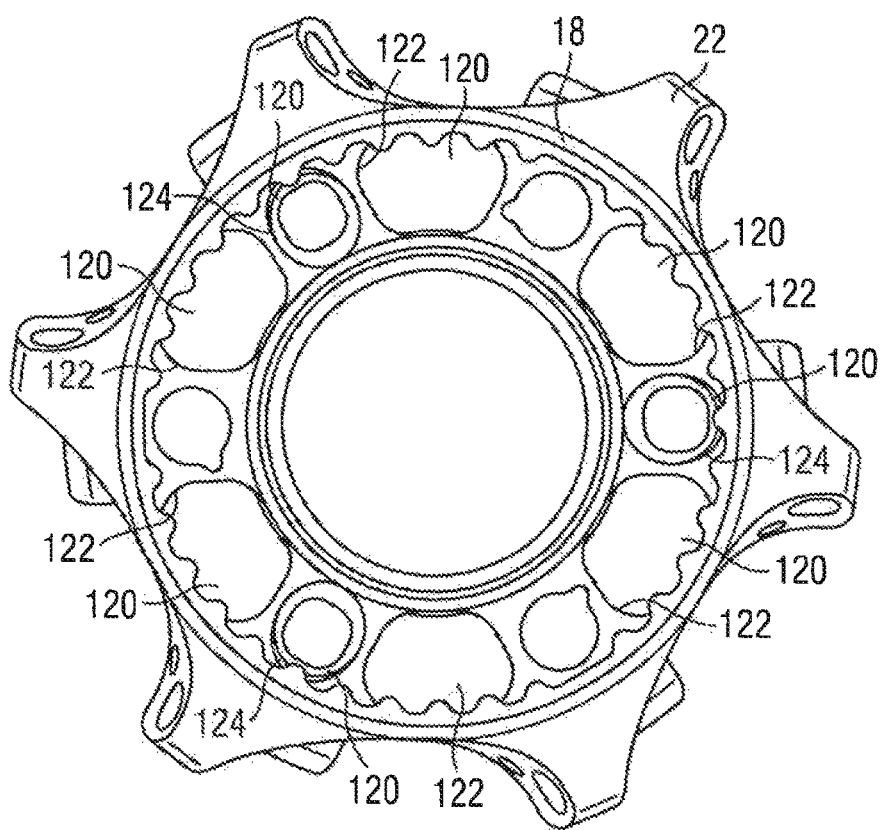
FIG. 18 shows a further sectional view of the freewheel hub according to the second embodiment.

FIG. 18 shows a front view of a hub sleeve 18 with the spoke flange 22 provided thereon. The hub sleeve 18 has various recesses 122 and 124. The recesses 122 are configured in an oval manner. The recesses 124 are configured in an annular manner. Sound-absorbing or sound-deadening elements 120, which match the shape of the particular recess, are pressed into the recesses 122 and 124.

The invention claimed is:

1. A hub for a bicycle, comprising:
a hub axle,
a hub sleeve which is mounted rotatably on the hub axle,
a driver which is mounted rotatably on the hub axle via a bearing arrangement and is coupleable to the at least one hub sleeve in a torque-transmitting manner, wherein the bearing arrangement has at least one axially inner bearing and at least one axially outer bearing,
further comprising at least one fastening element, which fixes at least the inner bearing of the bearing arrangement in its predetermined position on the hub axle by a local enlargement of the cross section of the hub axle, the at least one fastening element having at least one portion which is configured in a manner corresponding to the contour on the inner circumferential surface of the hub axle,
wherein the hub axle has a radially inward protruding protrusion having an inclined counterpart abutment surface on at least a portion of its inner circumferential surface, said contour interacting with the at least one fastening element, and
wherein the at least one portion, corresponding to the contour on the inner circumferential surface, of the fastening element has an inclined abutment surface.

2. The hub according to claim 1, wherein the at least one fastening element creates a press fit between the hub axle and the at least one inner bearing.

3. The hub according to claim 1, wherein the at least one fastening element is configured such that it converts a force acting along the hub axle into a radial enlargement of the cross section of the at least one hub axle.

4. The hub according to claim 3, wherein the at least one fastening element is accommodated in the hub axle so as to be movable in a direction along an axis of the hub.

5. The hub according to claim 4, wherein the at least one fastening element is configured such that it is braceable in the axial direction in the hub axle via at least one closure element.

6. The hub according to claim 1, wherein the portion having the inclined abutment surface has an increased wall thickness.

7. The hub according to claim 1, wherein the at least one fastening element is configured such that, in the unbraced state, it protrudes from the hub axle by a predetermined portion.

8. The hub according to claim 1, wherein the fastening element has at least one edge which is intended to enlarge the cross section of the hub axle.

9. The hub according to claim 8, wherein at least one freewheel device having a first clutch ring coupled to the hub sleeve and a second clutch ring coupled to the driver is provided between the at least one hub sleeve and the driver.

* * * * *